United States Patent [19]

Grimm

[11] Patent Number: 5,071,397
[45] Date of Patent: Dec. 10, 1991

[54] JAM TOLERANT GEARED ROTARY ACTUATOR WITH AUTOMATIC DISCONNECT

[75] Inventor: Duane H. Grimm, Rockford, Ill.

[73] Assignee: Sundstrand Corporation, Rockford, Ill.

[21] Appl. No.: 590,929

[22] Filed: Oct. 1, 1990

[51] Int. Cl.[5] .......................................... F16H 1/28
[52] U.S. Cl. ................................ 475/263; 475/300
[58] Field of Search ............... 475/263, 264, 298, 299, 475/300, 341, 342, 346, 347

[56] References Cited

U.S. PATENT DOCUMENTS

| | | | |
|---|---|---|---|
| 2,070,456 | 2/1937 | Spinney | 475/263 X |
| 2,690,685 | 10/1954 | Donandt | 475/263 X |
| 3,499,511 | 3/1970 | Bouhot | 192/56 |
| 3,898,817 | 8/1975 | Capewell et al. | 64/30 E |
| 3,968,705 | 7/1976 | Amano et al. | 74/424.8 R |
| 4,114,477 | 9/1978 | Iverson | 475/264 X |
| 4,189,960 | 2/1980 | Holdeman | 74/781 R |
| 4,282,776 | 8/1981 | Eller | 74/801 |
| 4,365,962 | 12/1982 | Regelsberger | 464/39 |
| 4,601,218 | 7/1986 | Bohle | 74/785 |
| 4,856,379 | 8/1989 | Jafarey | 74/805 |

Primary Examiner—Dirk Wright
Attorney, Agent, or Firm—Antonelli, Terry, Stout & Kraus

[57] ABSTRACT

A geared rotary actuator (1) including planet gears (2) disposed around a shaft (S), sun gears (8, 9) meshing with the planet gears (2) and with axially displaceable ramp members (10, 11) splined to the shaft (S) at least a pair of ball members (13, 14) are accommodated in pockets formed between the respective ramp members (10, 11) and a further member (12). Ramp surfaces (11a, 11b, 12a, 12b, 10a, 10b) are provided at the respective pockets to enable the ball members (13, 14) to ride out of the pockets upon an occurrence of an excessive torque thereby axially displacing the respective ramp members (10, 11) against a bias of springs (15, 16) coupled to the sun gears (8, 9) through planet gear radial support members (40 integrally formed with the sun gears (8, 9) thereby disconnecting a torque path through the actuator (1). Axial support for the radial support members (4) and ramp members (10, 11) is provided by struts (17, 18) fashioned as pins displaceable between an axial position and a transverse position upon the occurrence of excessive torque.

39 Claims, 2 Drawing Sheets

JAM TOLERANT GEARED ROTARY ACTUATOR WITH AUTOMATIC DISCONNECT

TECHNICAL FIELD

The present invention relates to a geared rotary actuator (GRA) and, more particularly, to a geared rotary actuator with an automatic disconnect upon the occurrence of an over torque condition due to a jamming action.

BACKGROUND ART

GRAs have many applications and, for example, may be employed to drive aircraft flight control surfaces; however, GRAs would be even more extensively used if concerns about potential loss of flight surface control due to gear mesh jams could be alleviated.

In, for example, U.S. Pat. No. 4,856,379, a nonjamming rotary mechanical actuator is proposed which includes at least one moving ring gear having an internal gear surface, with a fixed ring gear on each side of the at least one moving ring gear. Each fixed ring gear is provided with an internal gear surface defining a ring gear bore. A shaft extends through the ring gears, with the shaft including a first cam member rotatable with and secured thereon, and with an axis of the first cam member be offset from an axis of the shaft by a first amount of offset. The ring gears are maintained in a desired relationship by a retaining means which are rotatable with the shaft. Bearing means are mounted within the retaining means for rotatably supporting the shaft, and a generally cylindrical second cam member is provided having a bore extending therethrough. An axis of the bore is offset from an axis of the second cam member by a second amount of offset, with the first cam member being disposed within the bore of the second cam member and having a first amount of offset thereof approximately equal to the second amount of offset. A shear means transmits a torque from the first cam member to the second cam member below a desired torque level. A needle bearing is located around the second cam member, and a compound gear is secured over the needle bearing. The compound gear is provided with a number of gear tooth surfaces thereon, with the number of gear tooth surfaces being equal to a total number of fixed and moving gear rings and in driving relationship therewith below the desired torque level of the shear means.

While the above patented construction offers a solution, the solution has several shortcomings. More particularly, in the patented construction, upon sensing an increased torque in the event of a jam, an abnormal torque is utilized to shear a drive key to free the input shaft to continue to drive the other actuators in the system. An eccentric arrangement is employed to disengage a single planet gear from the output ring gears in the event of a jam to disconnect the actuator's torque path to the control surfaces. The provision of a shear key at the input of the high ratio actuator does not offer a very controllable shear setting and may be fatigue prone. Moreover, the provision of only a single planet provides for a one load path to react output torque, and, therefore, is less redundant, larger, and heavier than conventional multiple load path GRAs. Yet a further disadvantage of the above patented system resides in the fact that the planetary gear arrangement is inherently less efficient than conventional GARs for a given actuator gear ratio.

Examples of other types of torque responsive overload arrangements are proposed in, for example, U.S. Pat. Nos. 4,365,962, 3,499,511, 3,898,817, 3,968,705, 4,282,776, 4,601,218, and, 4,189,960.

Additionally, in commonly assigned U.S. application Ser. No. 07/590,927, entitled Jam Tolerant Rotary Actuator for Multiple Actuator Systems with a Single Prime Mover, filed on even date herewith, an alternative approach or solution for flight control surfaces utilizing multiple actuators is proposed wherein a compound planetary gearing is coupled in a manner so as to provide for speed compensation in the event of a gear mesh jam without any loss of position authority or torque capacity.

SUMMARY OF THE INVENTION

The present invention essentially resides in providing a geared rotary actuator utilized, for example, to drive aircraft flight control surfaces, which avoids, by simple means, shortcomings and disadvantages encountered in the prior art.

In accordance with the present invention, a geared rotary actuator is provided which may be utilized in a multiple actuator system for primary control surfaces such as, for example, a rudder, aileron, horizontal stabilizer, etc. or secondary flight control surfaces such as, for example, leading edge flaps, leading edge slats, etc. of an aircraft. In the event of a jam, an output torque path of the actuator is automatically disengaged from the flight control surface, while still retaining the ability to support radial flight surface loads to aircraft structure through the output ring gear bearings of the actuator. A through shaft of the GRA is freed from the jam by the same mechanism that disconnects the output load path thereby allowing the prime mover to continue to drive the flight surface with the remaining surface actuators.

The GRA of the present invention utilizes carrierless multi-planet compound differential gearing in an energy efficient sun-input/ring-reaction/ring-output arrangement, with the support rings maintaining gear engagement, and thrust washers locating the planets axially during a normal operation.

In accordance with advantageous features of the present invention, means are provided for detecting abnormal levels of torque and for displacing the support rings of the planet gear axially in response to a further rotation if a jam occurs. Radial gear separating forces are adapted to move the planet gears inwardly to disengage the output ring gears where the planet gears are retained until disassembly to determine a cause of the abnormal torque that initiated the disconnect.

The geared rotary actuator of the present invention comprises a means for defining a first torque path through the actuator during a first operative condition, with a means defining a second torque path to the actuator during a second operative condition. Means are provided for sensing an excess torque as a result of a relative rotation between the first and second torque paths and it disconnects one of the first and second torque paths upon the occurrence of the excessive torque. Means are provided which are responsive to the torque sensing means for axially displacing a driver means of one of the torque paths to disconnect such torque path through the actuator.

The means for defining the first torque path may, in accordance with the present invention, include a shaft means providing a torque through path through the actuator, with the means for defining the second torque path including a planetary gear means coupled to the through shaft means and providing an output to a control means such as, for example, the primary or secondary control surfaces of an aircraft. The planetary gear means advantageously includes a plurality of planet gears disposed about a periphery of the shaft means, with the driver means including a plurality of sun gear means meshing with the gearing of the planet gears in the first operative condition of the actuator and disconnected from the gearing of the planet gears in the second operative condition of the actuator.

Advantageously, in accordance with the present invention, the support rings are integrally fastened with the sun gears to accommodate the fact that both the sun gears and the support rings must be removed from engagement with the planet gears to allow a disconnect. Annular rings may be provided at the ends of the planet gears to eliminate relative rotation between the support ring/sun gears and avoid a need for thrust bearings.

To provide for a relatively simple sensing of the input torque, spring loaded annular ramp members cooperable with ball members form input torque sensors, with compound ramp angles to establish appropriate trip settings and to provide large axial forces to accomplish support ring separation in the event of a jam thereby avoiding the need for the provision of a shear means in the form of a shear key or the like.

According to the present invention, at least two ball members are interposed between the respective annular members and a further member provided on the shaft means, with the annular members and the further member including pocket means formed in opposing surfaces thereof for respectively accommodating the ball members. Ramp means are respectively provided at the respective pocket means so as to enable the respective ball members to be displaced from the pocket means upon an occurrence of an excessive torque thereby enabling an axial displacement of the respective annular members.

The annular members are normally biased in a direction of the further member provided on the shaft means so as to maintain the respective ball members in the respective pocket means during a normal operation of the actuator.

Additionally, in order to provide axial location of the support ring during normal operation, and to accommodate axial motion in the event of a disconnect, in accordance with still further features of the present invention, spherical ended struts are provided which are adapted to be displaced from a normal operational position interposed between the sun gears/support rings and a fixed member to a disconnect position substantially transversely to the position assumed during the normal operation.

In order to retain the planet gears inwardly away from the ring gears and restrain the planet gears from being radially outwardly displaced due to centrifugal force after a disconnect, radially acting elastic means are provided in the form of, for example, elastic bands or the like. Alternatively, or in addition to the radially acting elastic means, the planet thrust washers can could be spring loaded toward a center of the actuator to provide for planet radial retention.

To monitor the support ring location, according to the present invention, an external trip sensor could be provided to thereby also enable a visual indication of an actuator malfunction.

The above and other objects, features, and advantages of the present invention will become more apparent from the following description when taken in connection with the accompanying drawings which show, for the purpose of illustration only, several embodiments in accordance with the present invention.

DETAILED DESCRIPTION

Figure 1:
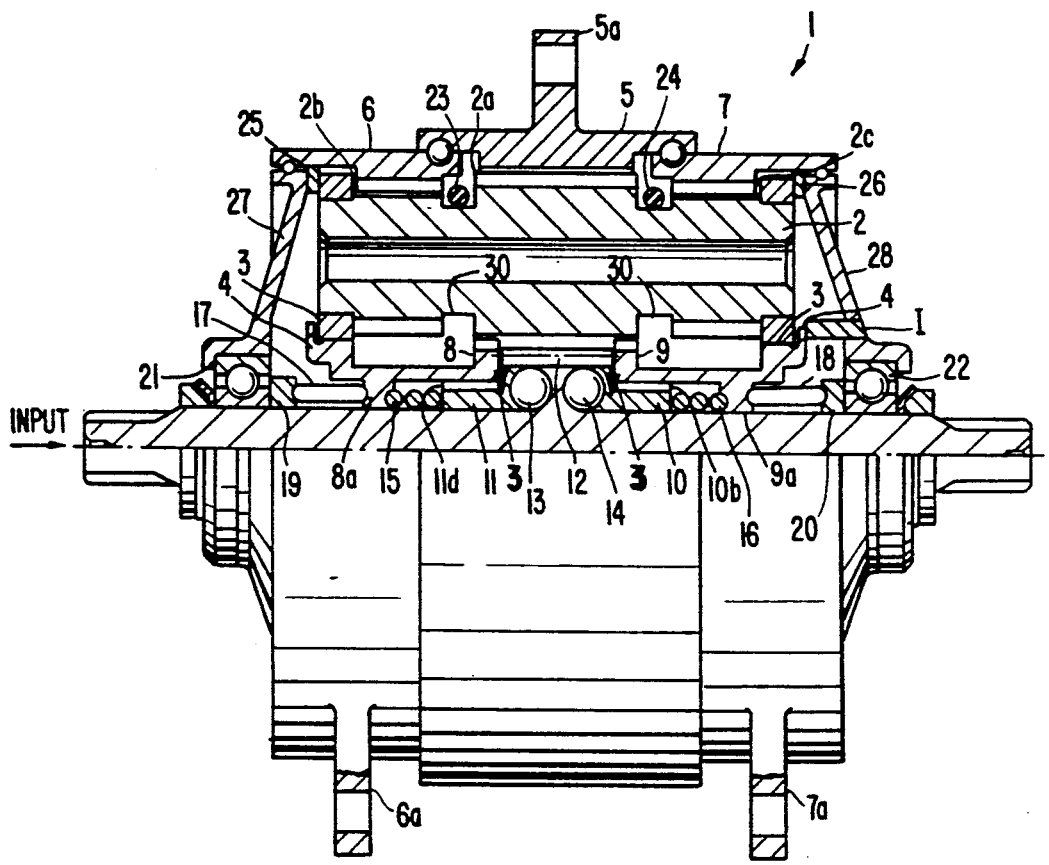
FIG. 1 is a schematic axial partial-cross sectional view of a geared rotary actuator with an automatic disconnect constructed in accordance with the present invention, during a normal operation.

Referring now to the drawings wherein like reference numerals are used throughout the several views to designate like parts, and, more particularly, to FIG. 1, according to this figure, a geared rotary actuator generally designated by the reference numeral 1, suitable for use, for example, in multiple actuator systems, for example, for primary and secondary aircraft flight surface control, includes a through shaft S, a plurality of planet gears 2, disposed about a periphery of the through shaft S, with only one planet gear 3 being shown in the drawings for the purpose of clarity. Each planet gear 2 has annular rings 3 arranged at axially opposite ends thereof, with the annular rings 3 being respectively supported by annular support ring members 4. An output member 5 includes an output arm 5a and internal gear teeth adapted to mesh with a gear teeth 2a of the respective planet gears 2 during a normal operation of the actuator 1, with additional gear teeth 2b, 2c being adapted, during normal operation, to respectively mesh with internal gear teeth of the fixed ring gears 6, 7 suitably provided with reaction arms 6a, 7a.

The gear teeth 2a of the planet gears 2, during normal operation, meshes with sun gears 8, 9 integrally formed with the respective support ring members 4. The support ring members 4 are coupled with the sun gears 8, 9 in order to accommodate the fact that both the support ring members 4 and sun gears 8, 9 must be removed from engagement from the planet gears 2 to allow any disconnecting to occur. Preferably, to minimize the number of components thereby increasing the overall reliability and to reduce the weight of the actuator 1, the annular support ring members 4 and the sun gears 8, 9 are formed as an integral or single assembly. Additionally, the annular rings 3 are provided at the respective ends of the planet gears 2 to eliminate any relative rotation between the support ring members 4/sun gears 8, 9 and avoid the need for thrust bearings.

Figure 3:
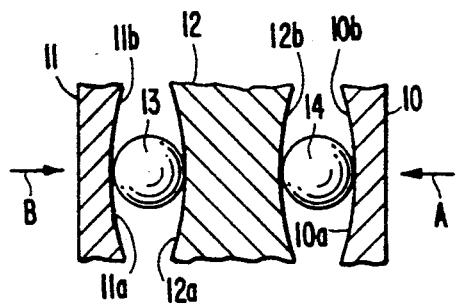
FIG. 3 is a partial cross-sectional view taken along the line 3—3 in FIG. 1.

Input torque sensors are provided in the form of spring-loaded ball and ramp arrangements comprising a pair of annular ramp members 10, 11 splined to the through shaft S so as to be rotatable therewith and axially displaceable with respect thereto. The ramp members 10, 11 each include gear teeth 10d, 11d adapted, during normal operation of the geared rotary actuator 1, to mesh with gear teeth 8b, 9b, the respective sun gears 8, 9 and ramp surfaces 10a, 10b, 11a, 11b, which, in cooperation with corresponding ramp surfaces 12a, 12b of a further annular ramp member 12 fixed to the through shaft S, accommodate ball members 13, 14 in a manner shown most clearly in FIG. 3.

The ramp surfaces 10a, 10b, 11a, 11b, 12a, 12b generally have a length sufficient to permit a predetermined relative rotation between the ramp members 10, 11, 12 of, for example, one half a turn or revolution. However, by properly dimensioning the ramp surfaces, any desired range of relative motion could be provided. Moreover, while only one pair of ball members 13, 14 are shown in the drawing, additional pairs of ball members 13, 14 may be provided and accommodated in circumferentially spaced pockets defined by the ramp members 10, 11, 12. Thus, for example, two pair of ball members may be utilized; however, ideally, to provide for a balanced arrangement, three pairs of ball members 13, 14 may be respectively accommodated in three circumferentially spaced pockets each having appropriate dimensioned ramp surfaces.

During a normal operation of the rotary actuator 1, the ramp members 10, 11, 12 form pockets between the respective ramp surfaces in which the ball members 13, 14 are accommodated. Biasing means fashioned, for example, as springs 15, 16, are arranged between the respective ramp members 11, 10 and abutment shoulders 8a, 9a of an associated sun/ring gear members 4, 8, 9. The springs 15, 16 normally urge the ramp members 10, 11 in a direction of the arrows A, B in FIG. 3 so as to maintain the ball members 13, 14 in the pockets during normal operation of the actuator 1.

Upon the occurrence of an excessive torque occasioned by a jamming or the like, the ball members 13, 14 are caused to ride along the ramp surfaces 10a, 10b, 11a, 11b, 12a, 12b, depending upon a direction of rotation, due to the relative rotation between the ramp members 10, 11, 12 caused by the jamming action. By appropriate selection of the compound ramp surface angles, it is possible to establish an appropriate threshold or trip setting representing abnormal levels of torque at which a disconnect is to occur, and to provide large axial forces to insure a separation of the support ring members 4 in a manner described more fully hereinbelow.

To provide for axial locating of the support ring members 4 during normal operation of the rotary actuator 1, strut members, fashioned as axial pins 17, 18 having spherical ends, are respectively arranged between the abutment shoulders 8a, 9a and annular abutment members 19, 20 splined to the through shaft S and axially fixed relative thereto by conventional bearing assemblies 21, 22 rotatably supporting the through shaft S. The abutment shoulders 8a, 9a and abutment members 19, 20 are provided with spherical pockets for accommodating the respective spherical ends of the respective pins 17, 18. The pins 17, 18 provide axial support for the support ring members 4 and associated sun gears 8, 9 during normal operation of the rotary actuator 1 and accommodate axial movement of the same during a disconnect.

While only a pair of strut means or axial pins 17, 18 are illustrated in the drawings, as can readily be appreciated, additional pairs of strut means may be provided and accommodated in appropriate spherical pockets or recesses provided at circumferentially spaced positions of the abutment shoulders 8a, 9a and abutment members 19, 20. Thus, with, for example, three pairs of ball members 13, 14, three pairs of axial pins 17, 18 may be provided to provide for a balanced arrangement.

Figure 4:
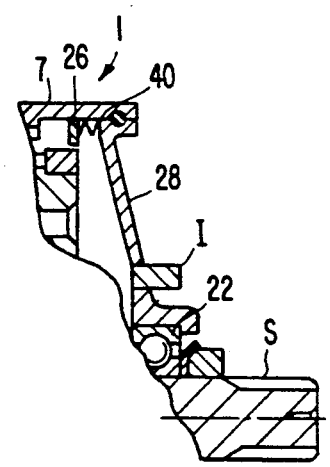
FIG. 4 is a partial cross-sectional view of another embodiment of geared rotary actuator in accordance with the present invention with a modified planet gear radial retention arrangement.

To retain the planet gears 2 radially inwardly after a disconnect, that is, to prevent the planet gears 2 from being displaced radially outwardly due to centrifugal force, elastic bands 23, 24, fashioned, for example, as O-rings, may be disposed about a periphery of the planet gear assembly. In addition to or in lieu of the elastic bands 23, 24, as shown in FIG. 4, biasing means, fashioned, for example, as springs 40, may be arranged between respective thrust washers 25, 26 and end covers 27, 28, with the springs 40 being adapted to displace the thrust washers 25, 26 axially inwardly to positively lock the planet gears 2 at the radially inward position following a disconnect of the rotary actuator 1.

Figure 2:
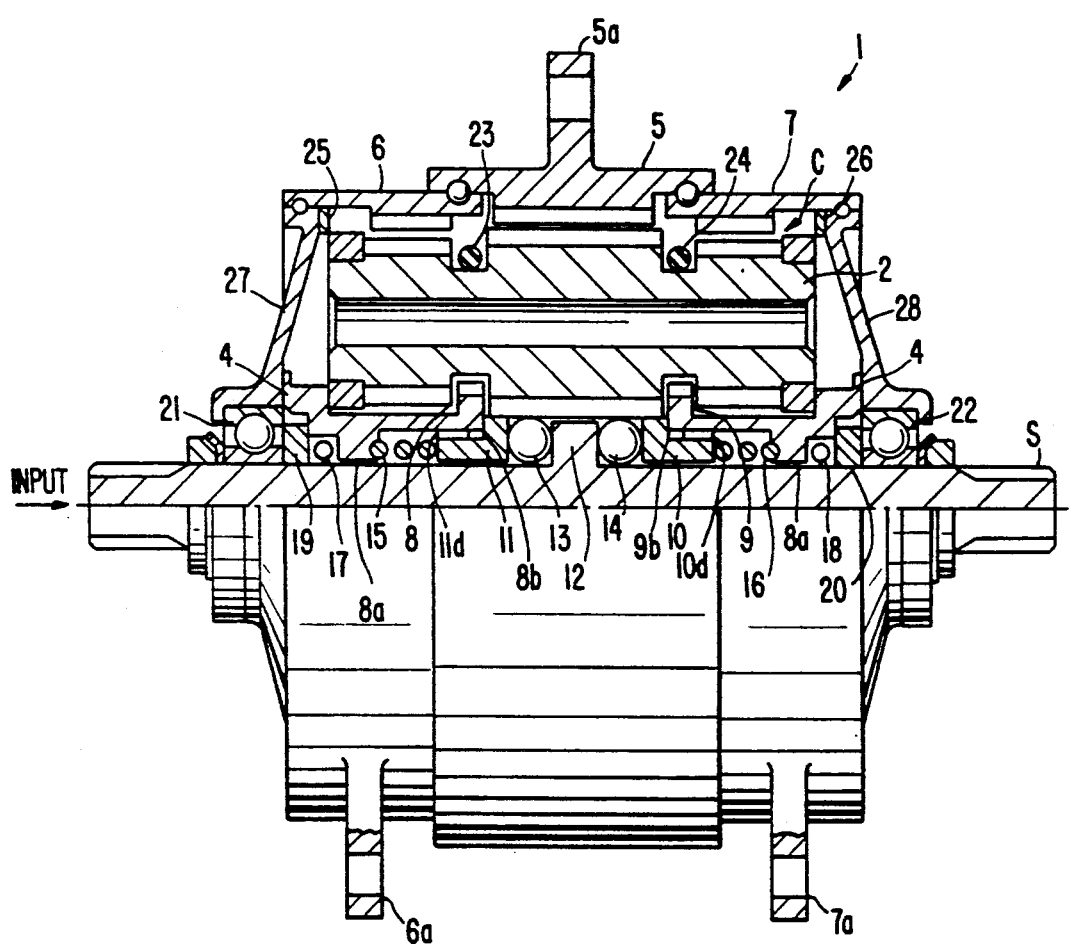
FIG. 2 is a schematic axial partial-cross sectional view of the geared rotary actuator of FIG. 1 in a disconnect condition.

During normal operation of the rotary actuator 1, an input is provided to the through shaft S from a prime mover (not shown) with the output from the rotary actuator 1 being provided through the sun gears 8, 9 and planets 2. Upon the occurrence of a jamming action, the increased torque results in a relative rotation between the ramp members 10, 11, 12 which, in turn, results in the ball members 13, 14 being displaced out of the pockets from the position illustrated in FIG. 3 to the position illustrated in FIG. 2. Since the pins 17, 18 merely provide axial support or loading, the relative rotation between the ramp members 10, 11, 12 results in the pins 17, 18 being tipped or tilted so as to assume the position illustrated in FIG. 2. With the pins 17, 18 so positioned, the axial loading on the support ring members 4 is relieved and the springs 15, 16 displace the respective support ring members 4 axially outwardly. The axial outward displacement of the support ring members 4 results in the respective annular rings 3 becoming disengaged from the support ring members 4 and the sun gears 8, 9, integrally formed with the support ring members 4, becoming disengaged from the gearing 2a of the planet gears 2 by virtue of the gearing of the sun gears 8, 9 being displaced from a meshing engagement with the gearing 2a of the planet gear 2 to a position at which the gearing of the sun gears 8. 9 are accommodated in notches of recesses 30 fashioned between the gearing 2b, 2a and 2a, 2c of the planet gears 2. The disengagement of the sun gears 8, 9 and support ring members 4 results in the planet gears 2 being radially inwardly displaced thereby resulting in a clearance C between the gear teeth 2a, 2b, 2c of the planets 2 and the associated gear teeth of the output member 5 and fixed ring gears 6, 7. The elastic band means 23, 24 and/or the spring biased axially displaced thrust rings 25, 26 (FIG. 4) retain the planet gears 2 in the radially inward position following the disconnect.

To enable a monitoring of an operative condition of the geared rotary actuator 1, an indicator member I (FIGS. 1 and 4) may be arranged, for example, in the end cover 28, with the indicator member I being, for example, displaceable outwardly of the end cover 28 as a result of the axial displacement of the support ring member thereby providing a visual indication exteriorly of the geared rotary actuator 1 of the existence of a malfunctioning of a disconnect condition of the geared rotary actuator 1.

While I have shown and described several embodiments in accordance with the present invention, it is understood that the same is not limited thereto but is susceptible to numerous changes and modifications as known to one of ordinary skill in the art, and I therefore do not wish to be limited to the details shown and described herein, but intend to cover all such modifications as encompassed by the scope of the appended claims.

I claim:

1. A geared rotary actuator comprising means defining a first torque path through said actuator during a first operative condition thereof, means defining a second torque path through said actuator during a second operative condition thereof, means for sensing an excess torque as a result of relative rotation between said first and second torque paths and for disconnecting one of said first and second torque paths upon an occurrence of said excess torque, and means responsive to said means for sensing for axially displacing a driver means of one of said torque paths to disconnect said one torque path through said actuator.

2. A geared rotary actuator according to claim 1, wherein said means defining a first torque path includes shaft means providing a torque through path through said actuator, and wherein said means defining a second torque path includes a planetary gear means coupled to said through shaft means and providing an output to a control means.

3. A geared rotary actuator according to claim 2, wherein said planetary gear means including a plurality of planet gears disposed about a periphery of said shaft means, and wherein said driver means includes a plurality of sun gear means meshing with gear teeth of said planetary gears in the first operative condition of the actuator and disconnected from said gear teeth of said planet gears in the second operative condition of said actuator.

4. A geared rotary actuator according to claim 3, further comprising means coupled with said sun gear means for radially supporting said planet gears in said first operative condition of said actuator.

5. A geared rotary actuator according to claim 4, wherein said means for axially displacing includes at least a pair of axially spaced annular members including gear teeth engageable with gear teeth of the respective sun gear means in said first operative condition of said actuator.

6. A geared rotary actuator according to claim 5, wherein said means for sensing includes at least a pair of ball members interposed between the respective annular members and a further member provided on said shaft means, said pair of annular members and said further member including pocket means for respectively accommodating said ball members and ramp means respectively extending from said pocket means so as to enable the respective ball members to be displaced from the pocket means upon the occurrence of the excess torque thereby axially displacing the respective annular members.

7. A geared rotary actuator according to claim 6, further comprising means for normally biasing the respective annular members in a direction toward said further member so as to maintain the respective ball members in the respective pocket means.

8. A geared rotary actuator according to claim 7, further comprising means for axially supporting said means for radially supporting said planet gears in said first operative condition of said actuator.

9. A geared rotary actuator according to claim 8, further comprising means for restraining said planet gears from being radially outwardly displaced in said second operative condition of said actuator.

10. A geared rotary actuator according to claim 9, wherein said means for restraining includes a plurality of elastic band means disposed about a periphery of said planet gears.

11. A geared rotary actuator according to claim 9, wherein said means for restraining includes thrust washer means provided at opposite axial ends of the planet gears, and biasing means for normally biasing said thrust washer means in a direction toward the respective axial ends such that the thrust washer means are brought into engagement with an outer peripheral portion of the planet gears in the second operative condition to restrain radial outward movement thereof.

12. A geared rotary actuator according to claim 11, wherein said means for restraining further includes a plurality of elastic band means disposed about a periphery of said planet gears.

13. A geared rotary actuator according to claim 9, wherein said plurality of sun gear means includes at least two sun gears, each of said planet gears includes at least three axially spaced sets of gear teeth respectively separated by a notch means, one of said sets of gear teeth of said planet gears being in meshing engagement with gear teeth of an output means coupled to said control means, and the other sets of gear teeth of the planet gears being respectively coupled to fixed ring gear means forming reaction members of said actuator.

14. A geared rotary actuator according to claim 13, wherein said means for axially supporting said means for radially supporting said planet gears includes at least a pair of pin means interposed between said means for radially supporting said planet gears and a fixed abutment means coupled to said shaft means, and wherein means are provided in said means for radially supporting said planet gears and said abutment means for accommodating respective ends of said pin means such that the pin means are axially disposed in said first operative condition of said actuator and substantially transversely disposed in said second operative condition of said actuator with respect to a longitudinal axis of said shaft means.

15. A geared rotary actuator according to claim 14, wherein the respective sun gear means are coupled to the respective means for radially supporting by being integrally formed as a single assembly.

16. A geared rotary actuator according to claim 15, wherein each single assembly includes a shoulder means having a first surface engageable with one end of the pin means in the first operative condition of said actuator.

17. A geared rotary actuator according to claim 16, wherein each shoulder means includes a second surface engageable with said means for normally biasing said annular members.

18. A geared rotary actuator according to claim 17, wherein said means for normally biasing said annular members includes spring means.

19. A geared rotary actuator according to claim 18, wherein each of said planet gears includes an annular support ring at respective axial ends thereof engageable with the respective means for annular supporting the planet gears in the first operative condition of said actuator.

20. A geared rotary actuator according to claim 19, further comprising means providing a visual indication of the operative condition of said actuator.

21. A geared rotary actuator according to claim 19, wherein the control means are primary control surfaces of an aircraft.

22. A geared rotary actuator according to claim 19, wherein said control means are secondary control surfaces of an aircraft.

23. A geared rotary actuator according to claim 1, wherein said means for defining a second torque path includes a planetary gear means providing an output to a control means, said driver means includes at least a pair of sun gear means including gear teeth adapted to mesh with gear teeth of said planet gear means in the first operative condition of the actuator and to be disconnected therefrom in the second operative position of said actuator.

24. A geared rotary actuator according to claim 23, wherein said means for axially displacing includes at least a pair of axially spaced annular members including gear teeth engageable with the respective sun gear means in said first operative condition of said actuator.

25. A geared rotary actuator according to claim 24, wherein said means for sensing includes at least a pair of ball members interposed between the respective annular members and a further member provided in said means defining the first torque path, said annular member and said further member including pocket means for respectively accommodating said ball members and ramp means respectively extending from said pocket means so as to enable the respective ball members to be displaced from said pocket means upon the occurrence of the excess torque thereby axially displacing the respective annular members.

26. A geared rotary actuator according to claim 25, further comprising means for normally biasing the respective annular members in a direction of said further member so as to maintain the respective ball members in the respective pocket means.

27. A geared rotary actuator according to claim 26, further comprising means for axially supporting said annular members in said first operative condition of said actuator.

28. A geared rotary actuator according to claim 27, wherein said means for axially supporting includes a pair of pin means respectively coupled to the pair of annular members in such a manner that said pin means are axially disposed in said first operative condition of said actuator and substantially transversely disposed in said second operative condition of said actuator with respect to a longitudinal axis of said actuator.

29. A geared rotary actuator according to claim 28, wherein means are provided for restraining said planet gears from radial outwardly displacement in said second operative condition of said actuator.

30. A geared rotary actuator according to claim 29, further comprising means for providing a visual indication of the operative condition of said actuator.

31. A geared rotary actuator according to claim 29, wherein the control means are primary control surfaces of an aircraft.

32. A geared rotary actuator according to claim 29, wherein said control means are secondary control surfaces of an aircraft.

33. A geared rotary actuator according to claim 1, wherein said means defining the first torque path includes a through shaft means, said means defining the second torque path includes a plurality of planet gears each having at least three axially spaced sets of gear teeth with one of said sets of gear teeth being connected to an output means for supplying an output to a control means and the other of said two sets of gear teeth being connected to fixed ring gear means, and wherein said driver means includes a pair of sun gear means respectively engageable with said other of said two sets of gear teeth.

34. A geared rotary actuator according to claim 33, wherein notch means are provided between the respective sets of gear teeth for accommodating the sun gear means in the second operative condition of the actuator.

35. A geared rotary actuator according to claim 33, wherein said means for axially displacing includes at least a pair of axially spaced annular members including gear teeth engageable with further gear teeth provided on the respective sun gear means in said first operative condition of the actuator, and wherein said means for sensing includes at least a pair of ball member interposed between the respective annular members and a further member provided on said shaft means, said annular members and said further member including pocket means for respectively accommodating said ball members and ramp means respectively extending from said pocket means so as to enable the respective ball members to be displaced from said pocket means upon the occurrence of the excess torque thereby axially displacing the respective annular members.

36. A geared rotary actuator according to claim 35, further comprising means for normally biasing the respective annular members in a direction of said further member so as to maintain the respective ball members in the respective pocket means.

37. A geared rotary actuator according to claim 36, further comprising means for axially supporting said annular members in said first operative condition of said actuator.

38. A geared rotary actuator according to claim 37, wherein the control means are primary control surfaces of an aircraft.

39. A geared rotary actuator according to claim 37, wherein said control means are secondary control surfaces of an aircraft.

* * * * *